March 28, 1933. H. D. COLMAN ET AL 1,903,231
ELECTRIC CONTROL UNIT
Original Filed Feb. 15, 1929  2 Sheets-Sheet 1
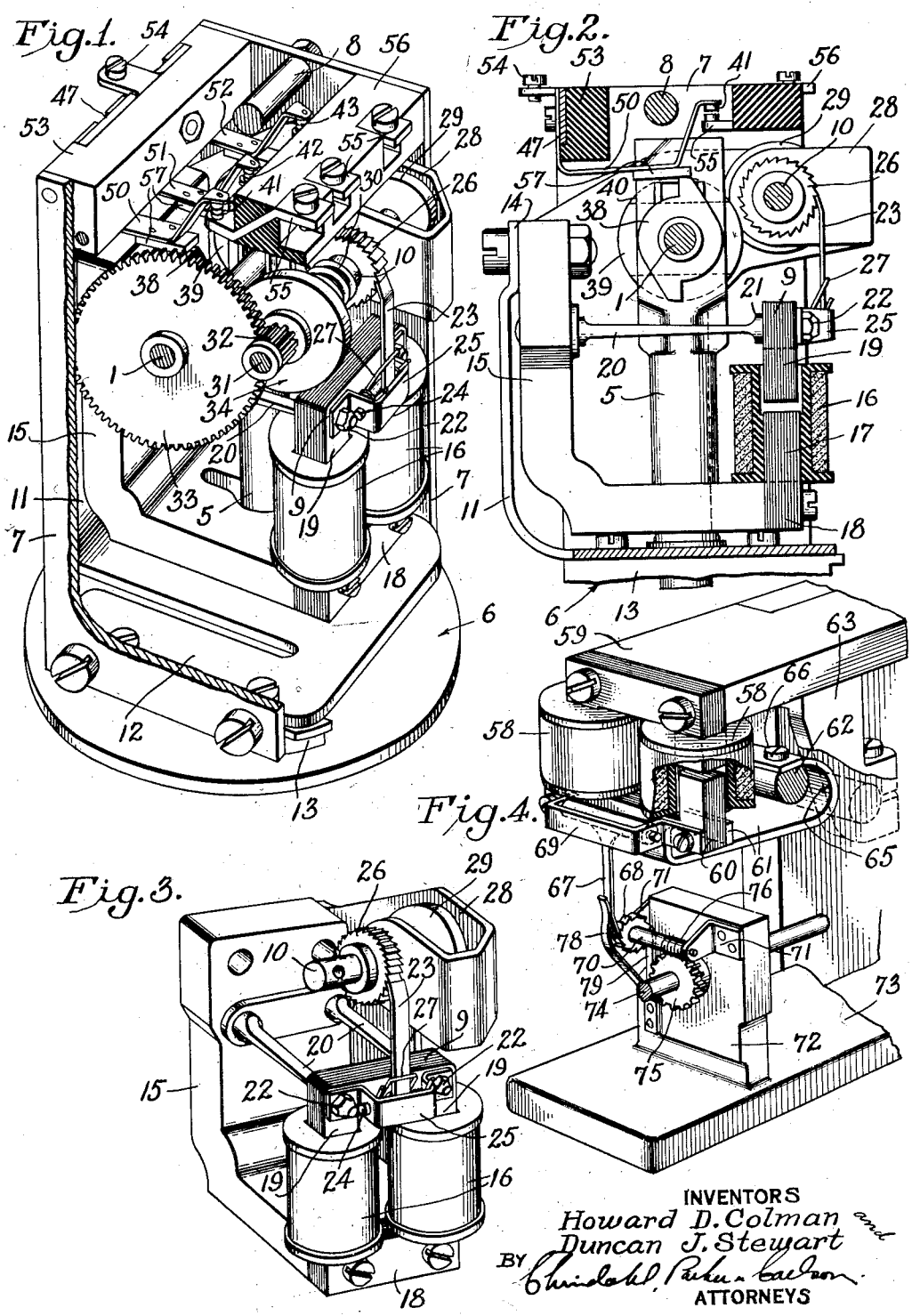
INVENTORS
Howard D. Colman and
Duncan J. Stewart
BY
ATTORNEYS March 28, 1933.  H. D. COLMAN ET AL  1,903,231
ELECTRIC CONTROL UNIT
Original Filed Feb. 15, 1929   2 Sheets-Sheet 2
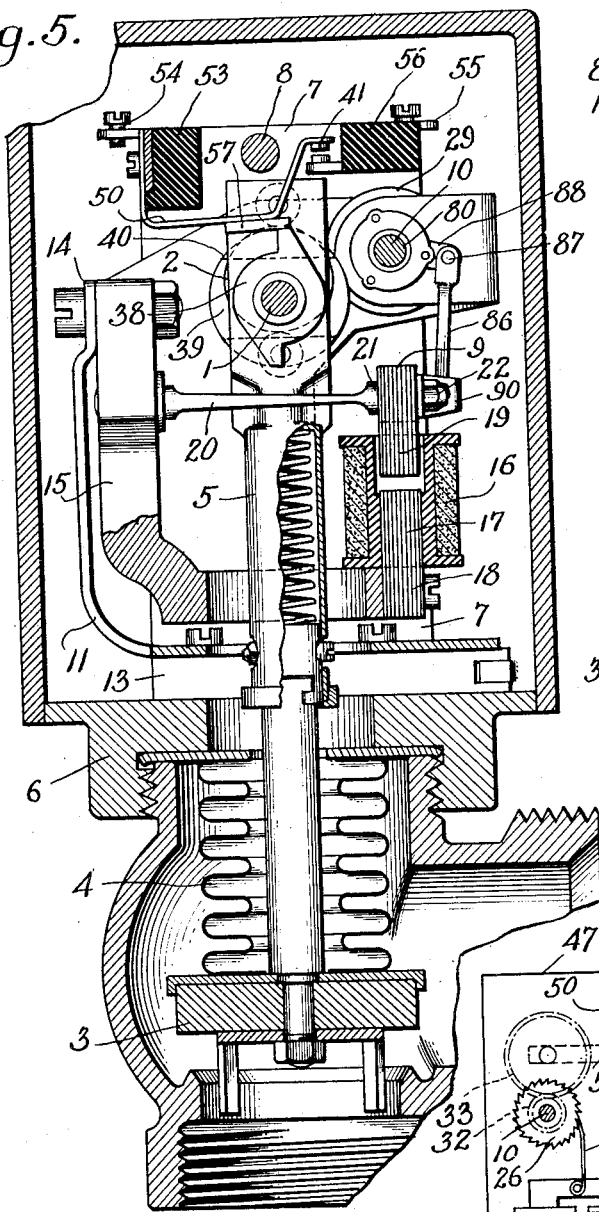
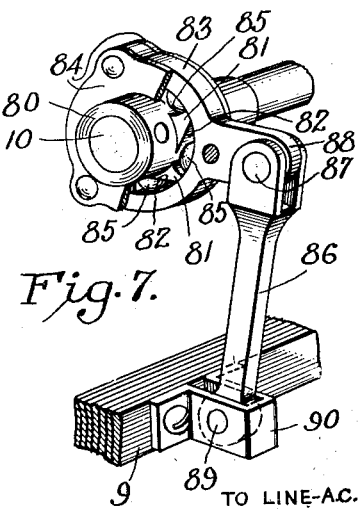
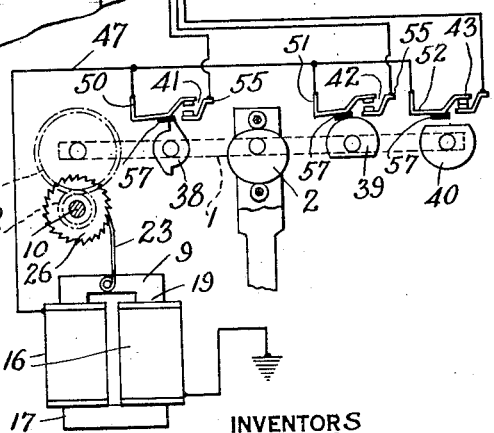
INVENTORS
Howard D. Colman and
Duncan J. Stewart
BY
ATTORNEYS Patented Mar. 28, 1933

1,903,231

UNITED STATES PATENT OFFICE

HOWARD D. COLMAN AND DUNCAN J. STEWART, OF ROCKFORD, ILLINOIS; SAID STEWART ASSIGNOR TO SAID COLMAN

ELECTRIC CONTROL UNIT

Application filed February 15, 1929, Serial No. 340,217. Renewed May 2, 1932.

The invention relates to an electrically driven power unit, which is especially adapted to be used for control purposes where the power requirements extend only to a small fraction of a horse power, and where a given operation is required to be performed in a short period of time and at relatively infrequent intervals.

One object of the invention is to provide a new and improved electric control unit which is of small dimensions so as to be adapted for use in closely restricted places, and which at the same time is able to perform reliably a given operation requiring the delivery of a substantial torque.

A further object of the invention is to provide an electrically driven control unit of a practical character, advantageously combining in a small compact and inexpensive structure, an electric motor and a controlling switch mechanism operatively associated with and governing the operation of the motor to define successive cycles of predetermined length.

Another object is to provide a control device having a power unit in the form of an electric vibratory motor characterized by the ability to develop a substantially greater torque than prior motors of corresponding size and further by the ability to develop normal torque and speed substantially instantaneously, and this without drawing a heavy starting current.

Another object is to provide a control unit having an electric vibratory motor whose armature forms part of a vibratory system which, when the motor encounters the maximum load condition in the performance of a given operation, is tuned to correspond approximately with the frequency of an alternating current energizing the motor magnet.

A further object is to provide a control unit having a vibratory motor associated with the parts to be operated in a manner such as to reduce the noise and wear and tear incident to the operation of the motor.

Still another object is to provide in a motor of the character indicated an improved construction for the magnet and armature such that substantially all of the available magnetic flux is effectually utilized, thus increasing the efficiency of the motor.

The objects of the invention thus generally set forth, together with other and ancillary objects and advantages are attained by the construction and arrangement illustrated in the accompanying drawings forming part hereof and hereinafter described. It is, of course, contemplated that various changes in the construction and arrangement set forth may be made by those skilled in the art without departing from the spirit and scope of the invention as expressed in the appended claims.

Referring to the drawings:

Figure 1 is a perspective view of a control unit constructed in accordance with our invention, one of the frame plates being broken away to expose the parts.

Fig. 2 is a vertical sectional view through the unit.

Fig. 3 is a perspective view of the motor unit detached.

Fig. 4 is a fragmental perspective view of a modified form of the invention.

Fig. 5 is a fragmental vertical sectional view illustrating the application of the control of the type shown in Figs. 1 to 3, to a valve.

Fig. 6 is a schematic illustration of a wiring diagram and controlling switch mechanism for governing the operating cycles of the control unit.

Fig. 7 is a fragmental perspective view of a different form of ratchet device from that shown in Figs. 1 to 4, for transmitting rotative impulses to the motor shaft.

The control unit, in the exemplary form shown in Figs. 1 to 3 and 5 of the drawings, is shown as applied to the operation of a radiator valve in an automatic temperature regulating system. It comprises generally a frame supporting a driven shaft 1 to be rotated unidirectionally by a small electric motor. In this instance the shaft 1 has a cam 2 adapted in successive cycles to reciprocate a valve member 3 toward and from its seat in the valve casing. As herein shown, the valve is of the packless type, embodying a flexible diaphragm 4, and the movements of the valve member by the cam are accomplished through the medium of a follower having a stem 5 with a yieldable lost motion connection with the valve member.

The frame is composed of a base 6 to which are secured the lower edges of two upstanding side plates 7 rigidly connected at their upper ends and held in spaced relation by a rod 8. The plates 7 provide journal mountings for opposite ends of the driven shaft 1.

The electric motor is compactly arranged preferably in the lower part of the frame, between the plates 7, and in the preferred embodiment the motor consists of an electromagnet adapted when energized from a source of alternating current to cause vibration of an armature 9 which is operatively associated with a rotary element in the form of a shaft 10 (Figs. 1 to 3).

To minimize the noise and wear and tear incident to the operation of a motor of the vibratory type, means is provided for yieldably supporting the motor so as to reduce the transmission of vibrations to the supporting frame and associated parts. In the present embodiment, this means comprises an L-shaped bracket member 11 formed from a plate of resilient steel or the like and having a horizontal arm with projections 12 which are screwed or otherwise secured to lugs 13 on the base 6. The other arm of the member 11 extends upwardly and has at its end an offset portion 14 to which is secured the upright leg of a substantially rigid frame member 15. The latter is shaped to correspond to the shape of the member 11, with which it is thus compactly nested in spaced relation. Thus the frame member 15 is adapted for up and down yielding movement relative to the supporting frame.

The motor magnet is preferably of the so-called horse-shoe type and comprises a pair of windings 16 on spools pressed in upright position onto two spaced pole pieces 17. The latter constitute the legs or cores of a laminated U-shaped field member 18 securely fastened as by screws to the end of the horizontal or free leg of the rigid motor frame member 15. The coils are preferably positioned on the pole pieces so that the upper ends of the latter terminate short of the upper ends of the coils which are left open to form sockets of substantial depth.

The armature 9 is also of laminated construction. As shown, it is U-shaped in form with depending legs 19 spaced to correspond to the pole pieces 17 and extending into the sockets or recesses in the coils 16. This construction effectually minimizes magnetic leakage by causing the flow of flux through the metallic path provided by the armature rather than from one pole directly to the other, as would be the case with some of the flux if the pole pieces of the magnet terminated at the ends of the coils. At the same time, by thus confining the ends of the armature within the windings of the magnet, an action simulating that of a solenoid is obtained. Such utilization of substantially all of the flux is important in that it decreases the amount of current required to energize the magnet and renders it possible to use smaller coils on the magnet.

The armature is supported for bodily movements toward and from the pole pieces 17, in a manner such as to maintain the two air gaps of equal lengths throughout the range of movement of the armature, and preferably so as to allow the legs of the armature to engage with the upper ends of the pole pieces, thereby momentarily forming at one limit of travel of the armature a practically complete metallic flux circuit which insures high efficiency for the magnet. In the present instance the supporting means is of a resilient character and is attached to the armature at spaced points in its length.

As shown in Figs. 1 to 3, the supporting means may comprise two arms 20 made of hardened spring steel rods with relatively thin and flat intermediate portions to give the desired degree of flexibility in the direction of movement of the armature. One end of each arm is securely clamped in the upright portion of the motor frame member 15 so as to extend substantially at right angles to a plane including the axes of the windings 16. The free ends of the arms are threaded and pass through holes in opposite ends of the armature 9, the latter being secured against shoulders 21 on the arms by nuts 22.

It will be observed that an extremely rugged cantilever support is provided for the armature, which effectually resists movement of the armature laterally and any tendency of the armature to twist in its bodily vibratory movements due to slight differences in the attractive forces exerted by the two magnetic poles. This insures that the air gaps between the ends of the armature and the respective poles shall be maintained equal and thereby avoids reduction in the attractive power of the magnet. Also it will be seen that when the armature is in neutral position, its legs 19 are disposed close to the ends of the pole pieces 17 and as they move toward the poles into mechanical contact therewith, the air gaps in the magnetic flux circuit decrease so that the attractive power of the magnet increases during the time that the spring arms 20 are being placed under increasing tension and interpose the greatest resistance to the movement of the armature.

In the form shown in Figs. 1 to 3, the means through the medium of which the vibrations of the armature are converted into rotary motion, is in the form of a ratchet device comprising a pawl 23 formed from a strip of spring steel and having an eye mounted on a pin 24 in a yoke 25 which is clamped against the outer side of the armature by the nuts 22. The pawl extends in a substantially vertical direction engaging at its free end with the peripheral teeth of a ratchet wheel 26 on the shaft 10, the teeth of the wheel being shaped to receive the thrust of the pawl in its movement away from the magnet poles. Such engagement is yieldably maintained by a light spring 27 coiled about the pin 24 and having an arm acting on the pawl.

The ratchet wheel 26, as herein shown, is fast upon the shaft 10 which is journaled at spaced points in the U-shaped end of a bracket arm 28 rigidly secured to one side edge of the motor frame member 15. Also rigid with the shaft 10 is a fly wheel 29 possessing sufficient inertia to prevent reverse rotation of the ratchet wheel while the armature is being attracted toward the poles.

Rotary motion of the shaft 10 is transmitted through the medium of a flexible coupling in the form of a coiled torsion spring 30 having one end anchored to the inwardly projecting end of the shaft 10. The other end of the spring is secured to the inner end of a stub shaft 31 which is rotatably supported by the adjacent frame plate 7. This shaft carries a pinion 32 which meshes with a relatively larger gear 33 on the driven shaft, the speed of the latter shaft being, therefore, considerably less than that of the shaft 31. A fly wheel 34 upon the shaft 31 possesses sufficient inertia to prevent appreciable mechanical vibration from being transmitted to the shaft by the spring coupling. That is to say, the torsion spring 30, though receiving energy intermittently by the blows struck by the pawl 23, tends to apply such energy uniformly to the shaft 31 due to the inertia of the fly wheel 34. This arrangement effectually minimizes the transmission of mechanical vibration through the driving connection between the motor and the driven shaft 1, thereby reducing the wear and tear on the gears and bearings as well as the noise incident to the operation of the motor.

The motor magnet is adapted to be energized from a source of alternating current of substantially constant frequency, and the armature, its spring supporting means, driving pawl, etc., constitute a vibratory system arranged to vibrate rapidly when the magnet is energized to impart rotative power impulses in rapid succession to the ratchet wheel 26. The total load opposing the rotation of the ratchet wheel is composed of the inertia of the parts, friction, and the applied load which must be assumed in the preformance any any given operation, and we have found that if the motor is to be capable of delivering sufficient driving torque to assume the total load it is of vital importance that the vibratory system be adjusted so as to have, when the driven shaft is under maximum load, a natural period of vibration substantially equal to twice the alternating current cycle, the armature being attracted by the magnet twice in each cycle. This is apparently due to the fact that the tuned relationship between the vibratory system and the applied alternating current insures that the rapidly changing positions of the armature will conform in proper manner to the changing value of the applied magnetic flux.

According to our invention, the desired tuned relationship is accomplished by proportioning the resilient armature support so that the free period of the vibratory system will, when the motor is delivering its maximum driving torque in the performance of a given operation, be approximately equivalent to twice the alternating current frequency. It is to be observed in this connection that the armature is made of substantial mass in order to carry the magnetic flux, and the spring arms 20 are made relatively stiff, that is to say constructed to have their tension change rapidly with small increments of movement of the armature. Thus the stiffness is determined not only by the weight of the armature and parts carried thereby, but also by the force opposing the rotation of the motor shaft 10 and is made greater than would be required merely to effect the idle vibration of the armature in phase relation to the current frequency.

Moreover, in order to utilize the power of the magnet to greatest advantage, the rotation impulse is applied to the shaft 10 in the movement of the armature by the spring arms in a direction away from the magnet, the attractive power of the magnet having in the previous part of the vibratory cycle been converted into mechanical energy and stored in the spring means.

Where the load applied to the control unit in performing a given operation is variable, the spring arms 20 are adjusted with respect to the maximum driving torque which may be required to be delivered at any time in the operating cycle. This time, in the case of the valve operator shown in Figs. 1 and 2, occurs at the time that the valve member is being forced to its seat through the yieldable lost motion connection provided by the stem 5, the resistance offered by the spring constituting a predetermined applied load. Thus the motor is designed to operate at maximum efficiency when the load is greatest. At other times in the cycle though the efficiency be somewhat reduced the opposing force is correspondingly less.

While any preferred means may be employed for controlling the energization of the motor magnet, we have herein shown in Fig. 6 a cycling means designed for use when the control device is employed in the operation of a valve or damper in an automatic temperature regulating system. Thus, referring to Fig. 6, the energization of the magnet coils 16 is under the joint control of a thermostat 35 embodying two switches 36 and 37, and of three cams 38, 39 and 40 on the shaft 1, said cams respectively operating switches 41, 42 and 43. The switch 41 controls a main or running circuit to the motor independent of control by the thermostat, and the switches 42 and 43, together with the thermostat switches 36 and 37, respectively control two auxiliary or starting circuits.

The main or running circuit extends from the secondary 44 of the step-down transformer to a conductor 45, thence through the contacts of switch 41, and a conductor 47, to the magnet coils 16, the latter, as well as the transformer secondary, being grounded.

For starting purposes, conductor 45 is connected to the intermediate thermostat contact common to the two switches 36 and 37, and the other two thermostat contacts are respectively connected by conductors 48 and 49 to the stationary contacts of the switches 42 and 43. The movable contacts of said switches 42 and 43 are connected with the conductor 47 leading to the magnet coils. These movable contacts, together with the movable contact of the switch 41, are respectively carried by spring arms 50, 51 and 52 anchored on a block 53 of suitable insulating material but electrically connected to a common terminal 54. The corresponding stationary contacts are carried by three arms 55 similarly anchored on a block 56 of insulating material but insulated from each other. Preferably these blocks 53 and 56 are fitted between and secured to the frame side plates 7, and the spring arms 50, 51 and 52 overlie the respective cams 38, 39 and 40 and each has secured on its underside a follower block 57 of insulating material with which the corresponding cam is adapted to engage.

The cam 38, it will be observed (Fig. 6), has two lobes thereon and the two cams 39 and 40 have oppositely positioned lobes respectively corresponding to the two lobes on the cam 38. Thus when the main or running circuit is interrupted by either lobe of the cam 38 to terminate one operating cycle, the starting circuit which is next to be closed by the thermostat has its cam-controlled contacts closed. Preferably the cams are so arranged that at the end of each cycle the starting switch contacts are closed at the same time or just before the running switch contacts open.

It will be observed that the cycling means is directly associated, in the present instance, with the driven shaft 1 which makes one-half revolution in each operating cycle. Also this means is advantageously located in an accessible position in the frame of the device, a position which lends compactness to the device in view of the arrangment of the motor unit on the lower or opposite side of the shaft 1.

The use of a vibratory motor in a control unit is advantageous because any tendency of the motor parts to stick due to long periods of idleness will quickly be overcome by the blows of the pawl 23 against the teeth of the ratchet wheel. Also the driven shaft 1 will cease to rotate almost immediately upon the disconnection of the coils from the source of alternating current owing to the low inertia of the operating parts of the motor and the fact that some speed reducing mechanism will ordinarily be employed between the motor shaft and the driven shaft. The current drawn by the motor in starting is the same as when the motor is running at normal speed. Moreover, a vibratory motor energized from a source of alternating current, requires no commutator, brakes, or interrupter contacts, all of which are a constant source of trouble.

While the motor is intended to develop but a small fraction of a horse power, it can, because of its inherent structural characteristics, be made in extremely small sizes, for example, one-thousandth of a horse power. Even when of such low capacity, the motor has been found to possess a power efficiency of approximately twenty per cent. as compared with efficiencies of less than one per cent. for rotary electrical motors of similar capacity. All of the above mentioned characteristics inherently possessed by the present motor, especially the ability to start and stop substantially instantaneously and to draw a low starting current, combine to render the motor as a unit particularly useful for control purposes such as in actuating a heat control valve in response to a thermostat or other sensitive control device. Owing to the cushioned support for the motor, and the ruggedness of its armature mounting, the power unit will, when used in a heat control or other system requiring infrequent operation, greatly outlast the service life of the valves or other devices with which it may be associated.

It will be observed that the ratchet shaft 10 and the alined shaft 31 are arranged parallel to the driven shaft 1 and in closely spaced relation thereto. This lends compactness to the unit and simplifies the gearing connection, eliminating end thrusts on the shafts and rendering lubrication unnecessary.

In Fig. 4 we have shown a different construction and arrangement of the parts of a vibratory motor unit especially adapted to operate the driven shaft at a predetermined constant speed. In this instance, an electromagnet 58 is firmly secured at the end of a rigid frame member 59 with the coils inverted as compared to the position occupied in Figs. 1 to 3. Similarly the position of the armature 60 is reversed.

The spring means for supporting the armature is in this instance made from a single piece of spring steel to form a wide spring arm 61 the free end of which is secured to and extends throughout the length of the armature and thus supports the same at spaced points. The opposite end of the arm is anchored to a shaft 62 adjustably secured in brackets 63 (one only being shown), said brackets depending from the top frame member 59 to increase the resiliency of the arm while providing a compact relationship, a reversely curved portion 65 is provided, the free end of which is anchored to the shaft 62 as by means of screws 66.

As in the previously described construction the ratchet device is in the form of a pawl 67 and ratchet wheel 68, the pawl is pivoted in a bracket 69 secured to the armature and depends therefrom for engagement with the ratchet wheel which is fast on a shaft 70 journaled in two supporting arms 71, the latter being carried by a post 72 rising from the base plate 73 of the frame. Also journaled in said post is the driven shaft 74 carrying a worm wheel 75 which meshes with a worm 76 on the ratchet shaft 70.

The pawl is spring pressed into engagement with the ratchet wheel by means of a leaf spring 78 secured at its lower end to the post and bearing on the free end of the pawl. A detent pawl 79 secured to the post engages the ratchet wheel on the side opposite the actuating pawl 67 so as to hold the ratchet wheel against reverse rotation.

The construction employed in this form of the invention lends itself to the operation of the shaft 74 at synchronous speed. In this connection it will be observed that the ratchet wheel and its shaft 70 are of small mass so as to reduce to a minimum any tendency of the motor to overrun, and the spring detent 78 acting against the ratchet wheel further tends to prevent overrun. As to the shaft 74 driven from the shaft 70, the worm gear connection between these shafts operates to prevent the shaft 74 and associated parts from transmitting rotative force, as a result of momentum, to the shaft 70. Thus the actuating pawl in its vibration advances the ratchet wheel only one step for each vibratory cycle resulting from the energization of the magnet, and since such energization occurs twice in each alternating current cycle the ratchet shaft is advanced two steps in each alternating current cycle. Accordingly when the magnet is energized from a source of alternating current of constant frequency the driven shaft 74 is driven at a predetermined constant speed.

In Figs. 5 and 7 there is shown a different type of ratchet device for converting the vibratory movements of the armature into rotary motion. In this device the rotary element is in the form of a sleeve 80 pinned on the shaft 10 and having spaced teeth 81 with inclined faces 82. A ring 83 encircles the teeth and has secured on opposite sides annular plates 84. Balls 85, inserted in the spaces between the teeth, are adapted in the counterclockwise movement of the ring 83 to become wedged between the inner periphery of the ring and the inclined faces 82 of the teeth. The armature 9 is connected to the ring by means of a link 86 having one end pivoted at 87 to an arm 88 rigid with the ring, the other end of the link being pivoted at 89 to a bracket 90 fast on the armature. It has been found that this form of ratchet device is efficient in operation and is very durable.

We claim as our invention:

1. An electric power unit of the type comprising an electromagnet and an armature operatively associated with an element to be driven and arranged to vibrate when the magnet is energized from a source of alternating current, characterized by having a controlling spring for the armature tuned to provide a vibratory system and so associated with the element to be driven that in one part of each vibratory cycle the power of the magnet is applied to effect the movement of the armature in a direction toward the magnet to store mechanical energy in the spring means, and in the other part of said cycle the armature is released to the action of the spring means for movement in a direction away from the magnet to apply the stored energy in the form of a power impulse to the rotation of said element, said spring being adjusted to provide for said system a period of vibration approximately corresponding to the oscillation of the applied current when a predetermined driving torque is delivered to said element.

2. An electric power unit comprising an electromagnet adapted to be energized from a source of alternating current of substantially constant frequency, an armature bodily movable toward and from the magnet, spring means controlling the armature, an element to be rotated, and a ratchet device actuated solely by said spring means in the movements of the armature away from the magnet to transmit power impulses in rapid succession to said rotary element, said spring means being adjusted to secure a natural period of vibration for the armature timed in accordance with the oscillations of the current energizing the magnet when a predetermined driving torque is imparted to said element.

3. An electrically driven control device comprising a frame, a shaft journaled in said frame, a member yieldably mounted in the frame, an electromagnet carried by said member, an armature for said magnet also mounted on said member for vibratory movements, relative to the magnet, a rotary element operatively connected with said shaft and journaled in said member, and means operable in the vibratory movements of the armature to impart rotational movement to said element.

4. An electrically driven control device comprising a main frame having journaled therein a shaft to be driven and a motor unit operatively connected with said shaft and having a rigid frame yieldably supported in the main frame, an electromagnet and a vibratory armature both mounted on said rigid frame, a rotary element journaled in the rigid frame and operatively connected with said shaft, and means operable in the vibration of said armature to impart rotational movement to said element.

5. An electrically driven power unit comprising an electromagnet and an armature, means for supporting the armature including a resilient arm extending in a direction substantially perpendicular to the axis of the magnet coil, a rigid frame member to which said magnet and said arm are rigidly secured, an element to be driven, means operable in the vibration of the armature to effect rotation of said element, and means for yieldably supporting said frame member for movement in the direction of movement of the armature.

6. An electric power unit comprising an electromagnet, an armature for said magnet, an element to be rotated, a rigid angular member having said magnet secured to one leg thereof and said armature resiliently mounted in the other leg thereof, a bracket rigid with said member and having said element journaled therein, and means operable in the periodic excitation of the magnet to transmit vibratory movements of the armature into rotary motion in said element.

7. An electric power unit comprising an electromagnet, an armature for said magnet, an element to be rotated, a rigid angular member having said magnet secured to one leg thereof and said armature resiliently mounted in the other leg thereof, a bracket rigid with said member and having said element journaled therein, and means operable in the periodic excitation of the magnet to transmit vibratory movements of the armature into rotary motion in said element, said armature being disposed between the magnet and said rotary element.

8. An electric control device comprising a rigid frame, an electromagnet carried by said frame, an armature mounted on said frame for vibratory movements toward and from the pole of said magnet, means supporting said frame for yielding movement in the direction of movement of said armature, a member rotatably mounted on said frame and driven in the vibration of said armature, a driven shaft rotatable about a relatively stationary axis, and a flexible coupling connecting said rotatable member and said shaft.

9. An electrically driven control unit having a motor comprising an electromagnet adapted to be energized from a source of alternating current of constant frequency, an armature arranged to vibrate once for each oscillation of the current applied to the magnet, a rotary element, and means operating in successive vibrations of the armature to impart successive rotational movements of substantially uniform length to said element whereby to rotate said element at a substantially constant speed.

In testimony whereof we have hereunto affixed our signatures.

HOWARD D. COLMAN.
DUNCAN J. STEWART.